US011073454B2

(12) United States Patent
Petel et al.

(10) Patent No.: US 11,073,454 B2
(45) Date of Patent: Jul. 27, 2021

(54) CINERADIOGRAPHY-BASED METHOD AND APPARATUS FOR TESTING PROTECTIVE HEADGEAR

(71) Applicant: Oren Petel, Nepean (CA)

(72) Inventors: Oren Petel, Ottawa (CA); Stephane Magnan, Ottawa (CA); Scott Dutrisac, Ottawa (CA); Karen Taylor, Manotick (CA); Ashley Mazurkiewicz, Ottawa (CA); Sheng Xu, Ottawa (CA); MacKenzie Brannen, Kanata (CA)

(73) Assignee: Oren Petel, Nepean (CA)

( * ) Notice: Subject to any disclaimer, the term of this patent is extended or adjusted under 35 U.S.C. 154(b) by 243 days.

(21) Appl. No.: 16/246,548

(22) Filed: Jan. 14, 2019

(65) Prior Publication Data

US 2020/0225133 A1  Jul. 16, 2020

(51) Int. Cl.
*G01N 3/06* (2006.01)
*G01N 3/30* (2006.01)
*G01T 1/20* (2006.01)
*G01N 3/303* (2006.01)
*G01N 3/313* (2006.01)

(52) U.S. Cl.
CPC ............ *G01N 3/068* (2013.01); *G01N 3/303* (2013.01); *G01N 3/313* (2013.01); *G01T 1/2006* (2013.01); *G01N 2203/0641* (2013.01); *G01N 2203/0647* (2013.01)

(58) Field of Classification Search
CPC ...... G01N 3/00–06; G01N 3/068; G01N 3/30; G01N 3/303; G01N 3/34; G01N 3/40; G01N 2203/0641; G01N 2203/0647; G01T 1/20; G01T 1/2006

See application file for complete search history.

(56) References Cited

U.S. PATENT DOCUMENTS

| 5,524,636 | A | 6/1996 | Sarvazyan |
| 7,768,624 | B2 | 8/2010 | Cherala et al. |
| 9,620,256 | B2 * | 4/2017 | Virshup ............... A61B 6/4283 |
| 9,826,954 | B2 | 11/2017 | Petel |
| 10,359,348 | B1 * | 7/2019 | Lytle ....................... G09B 9/00 |

(Continued)

FOREIGN PATENT DOCUMENTS

CA  2735615 C  5/2018

OTHER PUBLICATIONS

Beckwith JG, Zhao W, Ji S. et al. 2018. Estimated brain tissue response following impacts associated with and without diagnosed concussion. Annals of Biomedical Engineering. 46(6), 819-830.

(Continued)

*Primary Examiner* — Nguyen Q. Ha

(57) ABSTRACT

A method and apparatus for testing the response of protective headgear 104 to impact forces. A high-speed cineradiography imaging system 100 is used to obtain full-field, time-resolved internal monitoring and measurement of headgear component (pads 140 and liners 142) deformation and interaction with a head surrogate (headform 102), deformation of headform components, and stress and strain transfer into the headform. Radiopaque contrast materials (144 & 148) and integration techniques are used to highlight specific regions of interest within the headgear and headform components during the impact loading events.

42 Claims, 14 Drawing Sheets

(56) References Cited

U.S. PATENT DOCUMENTS

2003/0183025 A1  10/2003  Krstic
2008/0289438 A1  11/2008  Bertocci
2010/0012842 A1   1/2010  Cunningham
2011/0144955 A1   6/2011  Cooper et al.

OTHER PUBLICATIONS

Hoshizaki TB, Brien, SE. 2004. The science and design of head protection in sport. Neurosurgery. 55, 956-967.
Newman JA, Beusenberg MC, Shewchenko N. et al. 2005. Verification of biomechanical methods employed in a comprehensive study of mild traumatic brain injury and the effectiveness of American football helmets. Journal of Biomechanics. 38;1469-1481.
Padgaonkar AJ, Kreiger KW, King AI. 1975. Measurements of angular accelerations of a rigid body using linear accelerometers. Journal of Applied Mechanics 42; 552-556.
Viano DC, Halstead D. 2011. Change in Size and Impact Performance of Football helmets from the 1979's to 2010. Annals of Biomedical Engineering. 40(1); 175-184.

\* cited by examiner

CINERADIOGRAPHY-BASED METHOD AND APPARATUS FOR TESTING PROTECTIVE HEADGEAR

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND—FIELD

This application relates to a method and apparatus for testing the response of protective headgear to impact forces as a means of evaluating helmet and helmet component performance through observation and measurement of their deformation, as well as measurements of internal deformation and strain history within anthropomorphic test devices as a means of evaluating the potential for an internal injuries from an external traumatic force application.

BACKGROUND—PRIOR ART

Internal traumatic injuries caused by a non-penetrating impact event, such as a head impact or exposure to a blast wave, can have detrimental health outcomes. The objective of many personal protective equipment systems is to mitigate the effects of the impact forces imparted to the body. While protective equipment is often worn by individuals at risk of suffering impact trauma, such as athletes and security personnel, the possibility of trauma remains high despite the application of contemporary certification standards in equipment design. For example, helmets are designed to reduce the risk of skull fracture, however the risk of a less severe head injury, such as a concussion, remains.

Head and brain injuries are a major contemporary health concern, with significant challenges in proper diagnosis and treatment, including detrimental medium- and long-term health outcomes. The widespread use of helmets has reduced the incidence of severe brain injury and skull fracture, however, mild traumatic brain injury and concussion remain a health challenge. Helmet testing standards and injury evaluation techniques have been developed to improve the performance of and injury mitigating technologies. Ensuring adequate levels of protection of the brain from damage through these impact mitigating technologies is the goal of periodically refining the existing testing standards based on new biomedical research. One difficulty that is encountered in defining injury and acceptable levels of protection is the wide range of plausible impact variables and the uncertainty surrounding mechanisms of brain injury. The ability to accurately assess damage resulting from known input conditions is at the center of state-of-the-art improvements to injury mitigation, diagnosis, and treatment, as well as determining necessary parameters to define helmet protection in an attempt to reduce the risk of head and brain injury.

There are several types of helmets currently on the market and the design of each is modified based on the protective capacity required. Most helmets can be classified in two categories: single-impact (crash helmets) or multiple impact helmets. Crash helmets are designed for protection against one high energy impact, typical of ballistic, motorsports, and high velocity sports such as alpine or cycling. These helmets are constructed from an outer shell designed to distribute impact load. External shell deformation can be captured and measured using high speed cameras. In addition to the shell, the helmet consists of an internal soft liner, such as expanded polystyrene (EPS), which will deform plastically under impact often showing visible cracking once impacted. Liner cracking can be obscured to the user by an internal layer of comfort foam or webbed suspension, both of which are commonly used for user comfort. Multiple impact helmets, similar to singular impact helmets, are constructed from an outer shell and internal liner. The liner used in multiple impact helmets is often constructed from Vinyl Nitrile (VN) foam, Expanded Polypropylene (EPP), three dimensional (3D) engineered structures, or combinations of these components. These materials perform well under lower-energy contact and deform elastically, returning to their original shape after impact. Back face deformation (BFD) of the shell and deformation of the multi-impact helmet liner of is difficult to quantify as it is not visible during impact and returns to normal after impact. The performance of each component of the helmet can be modified by changing density, thickness, strength, and shape. The characteristics of these materials can be measured before or after impact using classical engineering materials tests. The performance of the helmet system as a whole is often measured using the evaluation metrics described in the following section. However, interaction between components of the helmet and evaluation of the response of the different helmet materials during impact has yet to be fully explored or characterized due to limited testing capabilities and methodologies.

The current standards for the certification and design of protective head protection equipment rely primarily rigid body diagnostic systems, such as accelerometers. These helmet testing protocols, as defined by numerous standards organizations, have been implemented to certify and evaluate head protection. While many standards organizations exist, each with a set protocol, this overview will highlight several such protocols and should not be taken as an exhaustive list, but an overview of the state-of-the-art in the field. Helmet standards for various athletic, industrial, and leisure activities are set forth by the International Standards Organization (ISO), American Society for Testing and Materials (ASTM), Canadian Safety Association (CSA), National Operating Committee on Standards for Athletic Equipment (NOCSAE), European Committee for Standardization (CEN/ECE), and National Institute of Justice (NIJ), among others. The primary metric used to evaluate non-penetrating impact trauma and head protection performance is the acceleration profile of a helmeted anthropomorphic head surrogate. The use of head surrogates, referred to as headforms, are well-known in the art. These testing standards typically consist of an impact test resulting from a monorail guided or free drop system, while some provide for the use of linear impact rams. Peak resultant linear acceleration is the most common metric of evaluation, which can then be applied to a pass-fail injury criteria, such as the Gadd Severity Index (GSI), among others. While GSI is in common use, it is limited as it does not utilize dynamic response directionality (brain motion) or account for impact location [Hoshizaki 2004]. In attempts to correlate impact response to injury, additional metrics have been developed and include, but are not limited to, peak resultant linear and rotational velocity. More recently, to evoke a rotational response of the head and address concussive injury risk, standard evaluations have been modified to include impacts resulting from a pneumatically-driven linear impactor. These further tests implement peak resultant rotational acceleration as an additional pass-fail performance metric. To further replicate sporting type impacts, rigid or suspended pendulums with an effective mass are used to represent the impacting object.

The external force applied to the head during impact can result from very diverse and complex impact events, which induce multifaceted series of mechanical and physical reactions, both within the helmet structure and liner components, as well as within the head of the user. When the head is impacted, the force and momentum from the impacting object are transferred to the helmet-head-brain structure, resulting in the deformation of the helmet and its associated components, the complex motion of the head, and the resulting movement of the brain. The brain tissue response from these interactions is not easily predicted, making helmet performance difficult to relate to injury mechanisms [Hoshizaki 2004]. Finite element modelling has attempted to fill this gap between helmet and headform response measurements and expected tissue strain fields, however significant variation between models exist [Beckwith 2018] and it is arguable that adequate validation of these computer models has been achieved. The constraints and lack of knowledge surrounding the mechanism of head and brain injury, in particular concussion, have led to insufficient helmet testing protocols, resulting in helmet designs that are not optimized to provide adequate protection. While it is clear that no helmet will eliminate the risk of concussion, risk reductions through design improvements can still be made.

The current methodologies available to investigate the response of the helmet to an impact do not include any empirical measurement of: (i) the interaction between the helmet shell and its liner materials and retention components, (ii) the interaction between the liner and the head of the helmet user, or (iii) the transfer of stress into the head of the helmet user, using solid or hollow headforms rather than tissue-simulating headforms. The methodologies described in the present invention provides for a means of examining these exact aspects of helmet performance.

The current focus in helmet design is the use of new liner materials and constructions that decouple the motion of the helmet from the head to ensure that the head is subjected to reduced or redistributed rotational components of acceleration. Alternate helmet designs that include buckling liner components have also been introduced in recent years. Aside from external visual verification of the outer shell response and acceleration measurements within a headform, there is no existing methodology in the field to visually determine the response of the helmet liner and retention components. The use of computational modelling has traditionally been used to fill these gaps. Similarly, the interaction between these liners and the head are not taught in the art. The present invention will teach a new methodology that will allow these components of the helmet and its interaction within the entire helmet system and interaction with the head of the user to be measured through radiographic means. These methodologies are complimentary to existing testing methodologies and can be conducted in conjunction with those tests.

Current research shows that brain tissue strain, a previously unconsidered injury mechanism in helmet testing standards, is linked to the onset of traumatic brain injury and concussion. At present, none of the testing methodologies outlined by the standards organizations implement a time-resolved measurement of strain within a headform to determine the strain and stress transfer into the head, nor do they teach the use of tissue-simulating headforms in their evaluations. Several varieties of headforms exist in the art, ranging in size, material, and mass. These headforms are designed with the intent of measuring the kinematic head response and do not feature measurement capabilities that would allow direct comparison to existing injury mechanisms relating to tissue strain. The standards organizations listed above outline the use of headforms and the preferred design of the headform for their testing standard.

The Hybrid III dummy head is one example of a headform commonly used by the automotive industry, sport impact biomechanics researchers, and government agencies to assess impact safety [Backaitis 1994, Newman 2005, Pellman 2003, Viano 2012]. It is an anthropometric representation of the human head with a mechanical response that is biofidelic for certain impacts against a rigid surface [Jadischke 2013]. The headform typically houses 3 accelerometers at the center of gravity and can have 2 accelerometers mounted along the top and front anatomical mid-sagittal and the side coronal plane in a 3-2-2-2 configuration [Padgaonkar 1975]. Additional mounting options include but are not limited to an externally mounted 3 accelerometer array, an internal triaxial or uniaxial accelerometer mounted on a fixed block, or a wireless array. The Hybrid III is currently the gold standard for measuring the dynamic response of the head in terms of linear and rotational acceleration [Jadischke 2013]. From the variation in headforms available, one cannot account for the variability of size, shape, and mass among the human population. However, they aim to produce repeatable unique responses specific to the kinematic response of the head upon impact, which can be used for injury reconstruction, helmet testing, and helmet design innovation.

The methods and apparatus of the present invention have the advantage of allowing direct visualization of the response of helmet shells, liners, and retention systems, as well as force transfer into the head of a helmet user in addition to the metrics often used in helmet testing for evaluation purposes and instructing helmet design.

SUMMARY OF INVENTION

In light of the state of prior art in the field of injury biomechanics, it can be appreciated that there exists a need for a novel methodology of headgear performance evaluation that enables a full-field, time-resolved internal monitoring and measurement of (i) the deformation of helmet liners, retention systems, and outer shells during impact testing, (ii) the coupling and interaction of the liner, retention systems, and shells to the testing surrogate (i.e., headform), and (iii) the related transfer of stress into the testing surrogate, resulting in deformation of the surrogate headform or deformation of tissue-simulants within the headform.

Several iterations of the invented methodology as well as the associated high-speed cineradiography imaging system that enables visualization of these interactions are disclosed. The preferred embodiments of the methodology include a variety of radiopaque contrast materials and integration techniques to highlight specific regions of interest within the headgear and headform during the impact loading events. These contrast markers are not required in all cases, however they provide enhance the clarity of the radiographic images. The advantage of this invented methodology is the ability to visualize the interaction of the helmet and its components materials with the head surrogate as it responds to an impact force in a manner that hitherto required computational investigation.

Figure 1:
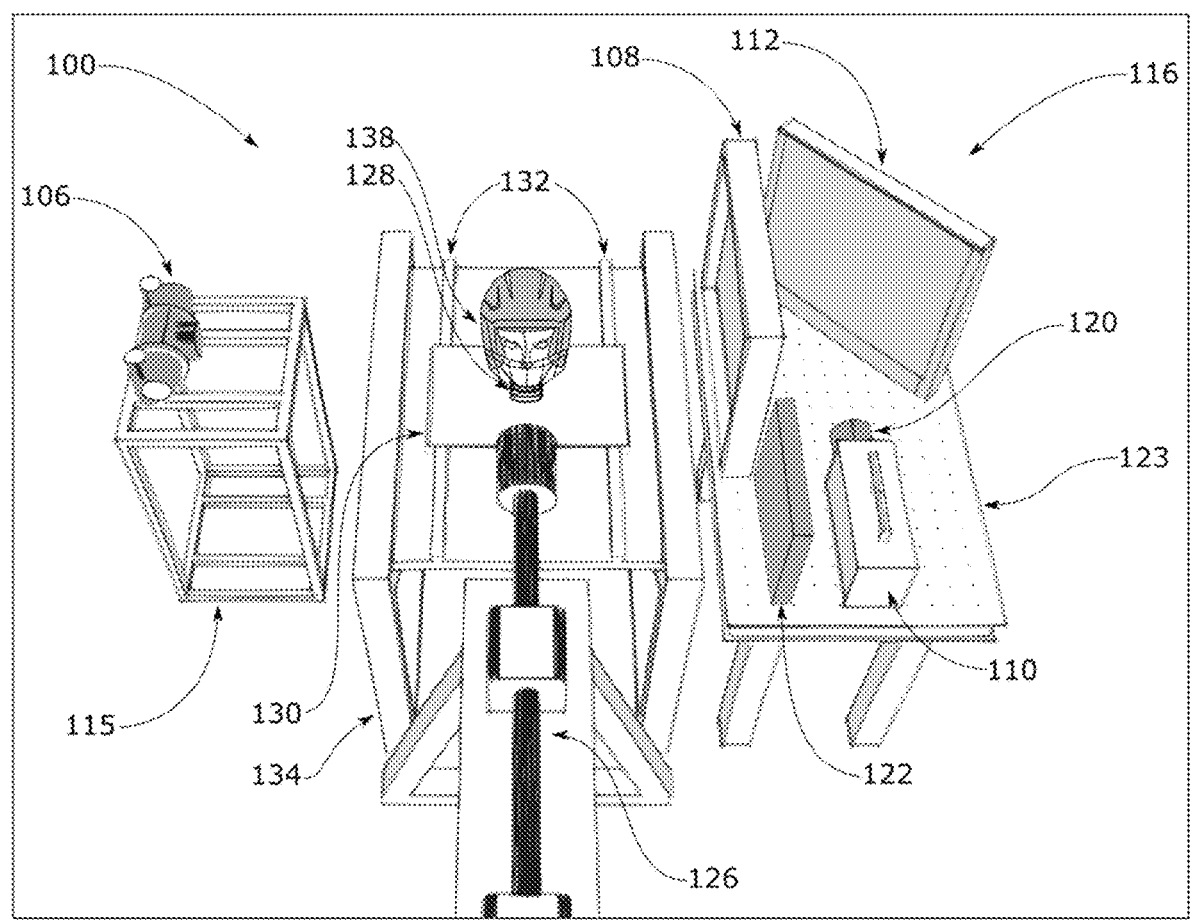
FIG. 1 is a perspective view of the preferred embodiment of the cineradiography-based protective headgear testing apparatus as per the present invention.

| Drawings - Reference Numerals | | |
|---|---|---|
| Number | Item | FIGS. |
| 100 | Cineradiography system | 1, 9, 12, 14 |
| 102 | Headform | 1, 2, 3, 6, 8, 9, 10, 11, 12, 14 |
| 104 | Headgear/Helmet | 4, 5, 6, 7, 8 |
| 106 | X-Ray Tube/source | 1, 2, 9, 12, 14 |
| 108 | Scintillator | 1, 2, 9, 12, 13 |
| 110 | High-speed camera | 1, 9, 12, 13, 14 |
| 112 | Mirror | 1, 9, 12, 13 |
| 114 | Incident X-ray beam | 2 |
| 115 | X-ray source support structure | 1, 2, 9, 12, 14 |
| 116 | Image capture system | 1, 12 |
| 118 | X-ray projection | 2 |
| 120 | Lens | 1, 9, 12, 13 |
| 122 | Lead wall | 1, 9, 12, 13, 14 |
| 123 | Optical breadboard table | 1, 2, 9, 12, 13, 14 |
| 126 | Linear impactor/Impact source | 1, 9, 12, 14 |
| 128 | Neck | 1, 9, 12, 14 |
| 130 | Sliding table | 1, 2, 9, 12, 14 |
| 132 | Rails | 1, 2, 9, 12, 14 |
| 134 | Grounded table | 1, 2, 9, 12, 14 |
| 136 | Helmet retention system(s) | 5, 6 |
| 138 | Helmeted headform | 1, 6, 8, 12 |
| 140 | Helmet pad(s) | 4, 7, 8 |

| Drawings - Reference Numerals (continued) | | |
|---|---|---|
| Number | Item | FIGS. |
| 142 | Helmet liner | 4, 7, 8 |
| 144 | Contrast materials | 7 |
| 146 | Helmet shell | 4, 7, 8 |
| 148 | Internal contrast markers | 2, 8, 10, 11 |
| 152 | Image intensifier | 9, 13 |
| 153 | Coupler lens | 13 |
| 154 | Anti-scatter grid | 9, 13 |
| 156 | X-ray image intensifier | 14 |

DETAILED DESCRIPTION OF THE INVENTION

The preferred embodiments of the apparatus and invented methods that are presented herein are not intended to limit the invention to these specific embodiments. Simple modifications, alternatives, and equivalents of the invention are covered by the scope of the invention as defined by the claims.

The testing methods and data collection enabled by the present invention in this preferred embodiment are meant to supplement existing testing standards as per the state-of-the-art, providing a visual correlation between behaviour of a helmet and measured parameters, such as acceleration at the center of mass of a headform. A non-exhaustive list of current helmet testing standards that would benefit from the present invention are ASTM F717-10, ASTM F1446-15, NOCSAE ND081-18am19, and NOCSAE ND001-17m17b, among others.

Preferred Embodiment

The testing method and preferred embodiment of the cineradiography-based protective headgear testing apparatus 100 involve the use of X-rays to observe the impact force response of headgear, typically in the form of a helmet 104, placed on a headform 102. Impact events are highly dynamic events that require high temporal resolution to adequately capture the response of the helmet resulting from the application of the impact force. A desirable image capture rate, to properly resolve the impact with confidence, would require between 5,000 and 10,000 frames per second. With a continuous X-ray source, this is achievable for an extended capture period, provided the source and receiver optics are properly tuned.

Shown in FIG. 1 is the preferred construction of the cineradiography apparatus ("X-ray system") 100 to capture the response of the headform 102, the helmet 104, and their interaction. This cineradiography system is optimized for high speed image capture. The major components of the apparatus include an X-ray tube ("X-ray source") 106, scintillator panel 108, high-speed camera 110, and mirror 112.

Figure 2:
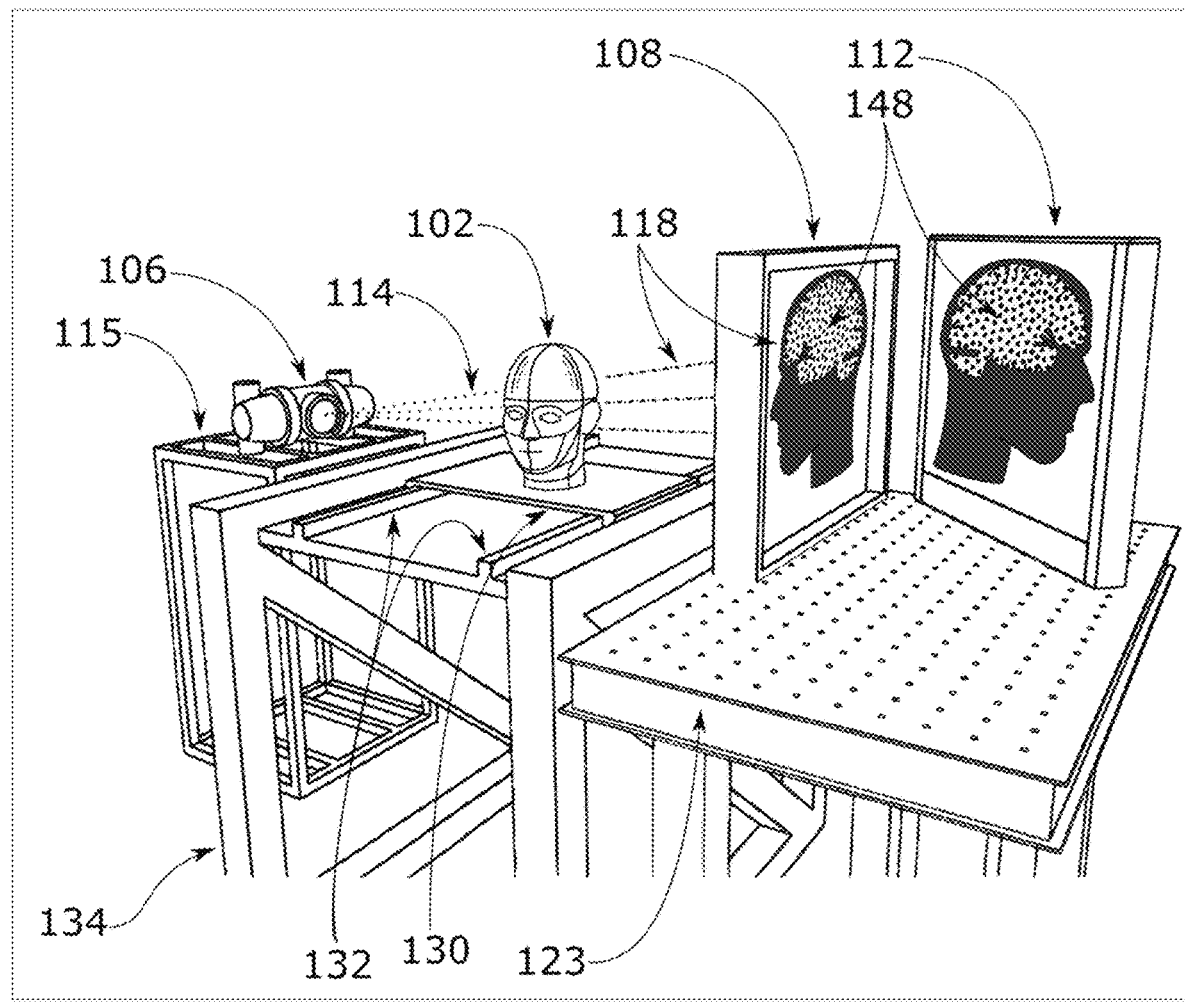
FIG. 2 is a perspective view of the cineradiography equipment as in FIG. 1, illustrating the path of the incident and projected X-ray beams.

To generate the incident X-ray beam 114, a high-flux output X-ray tube 106 is required (FIG. 2). Given the low density of headgear components, medical grade soft X-ray tubes are preferred. The present embodiment uses a Varex Imaging G1092 X-ray tube with a power of 100 kW, peak voltage of 150 kV, and target angle of 12 degrees. In this embodiment, the X-rays must be generated continuously, as a pulsed beam will not meet the high frequency required by the image capture system 116 for continuous imaging. The X-ray source 106 is mounted to an adjustable support structure 115, allowing alignment with the image capture system 116 in three Cartesian planes (vertical, horizontal, and transverse).

To be captured by the high-speed camera 110, the X-ray projection 118 must be converted to visible light, which is accomplished with a scintillator 108. The preferred scintillator 108 is a composed of columnar structured Thallium-doped Cesium Iodide crystals, CsI(Tl). The conversion efficiency of these scintillators is about 54 photons/keV of X-ray. The present embodiment uses a Hamamatsu 10666-200 scintillator 108, which has a large effective area (44 cm×44 cm), a thin aluminum substrate that provides high light output combined with excellent X-ray stopping power for the soft X-ray source 106. The output of visible light from these scintillators peaks at about 550 nm with an emission decay time on the order of about a microsecond, allowing for high-speed image capture. In order to maximize the temporal resolution of the image capture system 116, a high-speed camera 110 with peak sensor sensitivity that adequately matches the scintillator output is chosen to maximize light capture and optimize signal-to-noise ratios. Other high-sensitivity camera sensors would work, however matching the sensitivities of the components is beneficial to the operation of the system. The current preferred embodiment of the apparatus uses a NAC Memrecam HX-3 camera with a monochrome sensor. The monochrome sensor has a peak quantum efficiency that nearly matches the scintillator output, which was the reason for its selection. This camera 110 can be operated in a high-speed mode where its 4-megapixel array is binned to effectively have much larger pixels and improved light sensitivity. In order to maximize the effective modulation transfer function for the system, the preferred embodiment uses a Nikon f/1.2 50 mm lens 120 to maximize lens aperture to increase the quantity of light incident on the camera sensor.

The preferred embodiment requires a primary surface mirror 112 angled at 45 degrees from the incident X-Ray beam 114, placed between the scintillator 108 and the high-speed camera 110 to direct visible light from the scintillator surface to the camera. The mirror 112 allows the high-speed camera 110 to be positioned out of the direct line of the incident X-rays 114. A lead wall 122 is used to protect the camera sensor from direct exposure to errant X-rays. X-ray photons that land directly on the camera sensor result in image hot-spots, degrading image quality. For the current embodiment, the distance between X-ray source 106 and the scintillator 108 typically ranges between 35 and 39 inches, optimizing the illumination of the scintillator area. To allow adjustment for various configurations, the image capture system 116 components are mounted to an optical breadboard table 123.

This embodiment allows high-contrast images to be recorded at capture rates of about 10,000 frames per second through the headform 102. Based on the decay characteristics of the chosen scintillator, the maximum sensible capture rate for this X-ray system 100 in its present embodiment is about 100,000 frames per second, although spatial resolution and contrast-to-noise ratio are sacrificed as the capture rate increases. For sport-related impacts, 10,000 frames per second is sufficient, although there are some applications of the apparatus, such as the investigation of behind armour or behind helmet trauma, where capture rates of 20,000 frames per second or greater are beneficial.

The X-ray system 100, due to the magnification factors and possibility of out-of-plane motion and rotation, requires calibration to account for possible measurements errors. The calibration process involves mapping out the region between source 106 and scintillator 108 using a calibration template to determine error bounds based on expected out-of-plane motion. The headform 102 or helmet 104 can be fitted with a series of fiducial markers of known size that will assist in the calibration of the images for analysis or monitored separately using additional optical cameras to determine the degree of out-of-plane motion for the error estimates. For an overview of the expected errors associated with out-of-plane motion of an object to internal displacement measurements, one should read the Master's Thesis of Stephane Magnan.

The headgear 104 testing method, integrating the cineradiography-based apparatus 100, will be described below. The cause of the impact force may be any number of test apparatuses, such as drop tower or linear impactor, among others. For the purposes of this disclosure, a linear impactor 126 will be shown and discussed, however this in no way limits the usefulness of the test methodology to linear impactors alone, precluding the use of alternative loading techniques.

Figure 3:
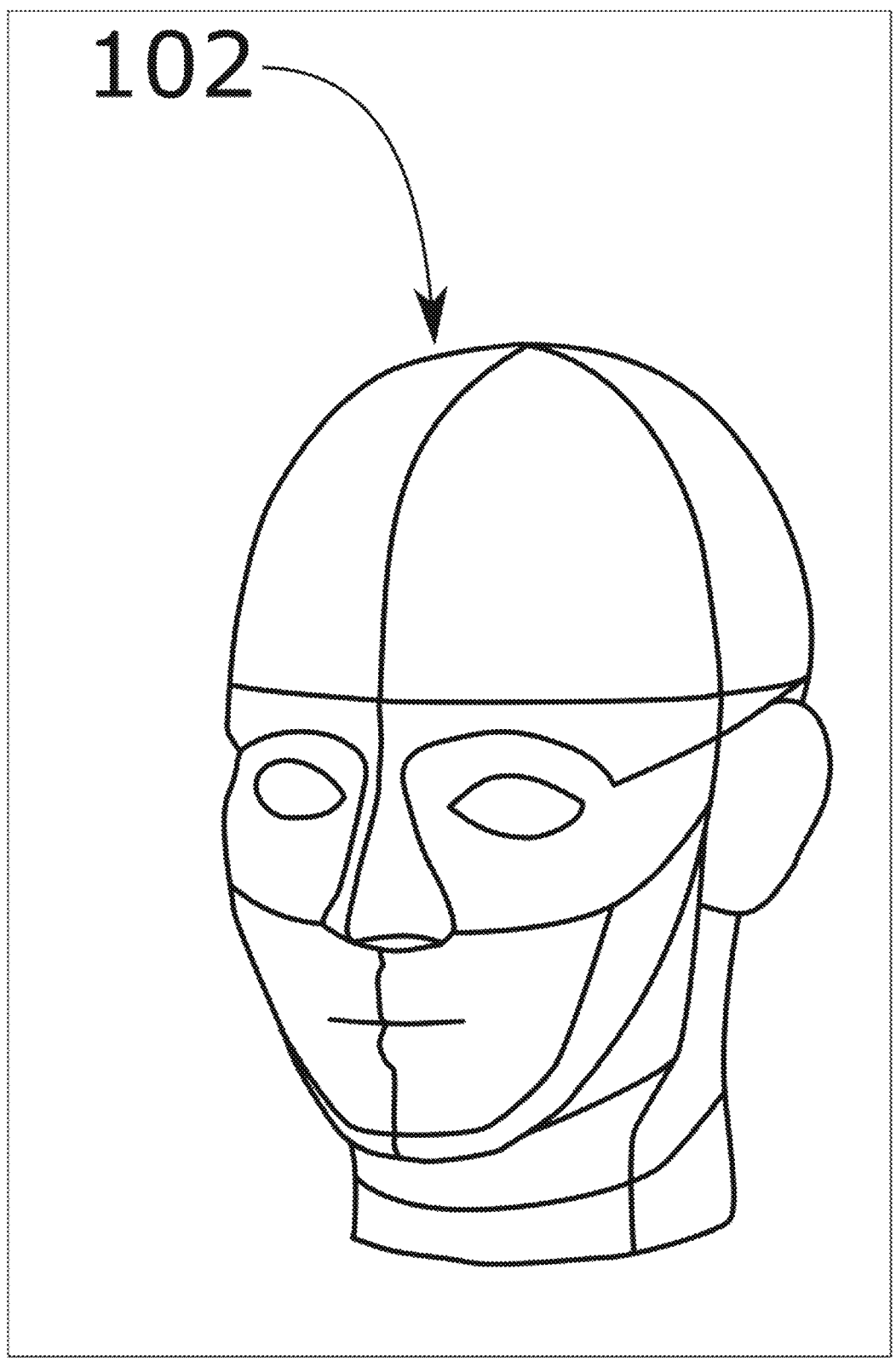
FIG. 3 is a perspective view of the headform of FIGS. 1,2.

The headform 102 is mounted to a multi-degree of freedom neck 128 which is fixed to a sliding table 130. The sliding table is attached on rails 132 to a rigidly grounded table 134. The headform 102 should incorporate a method to capture kinematic response. The present embodiment uses a DTS 6DX-PRO that is mounted at a predetermined distance from the center of gravity of the headform 102. There are several commercially available headforms, such as the schematic of a headform shown in FIG. 3, that are in use for testing headgear. The most commonly used headforms is the Hybrid III.

The protective headgear (helmet) 104 is placed onto the headform 102, fastening the retention system(s) 136 of the helmet to the headform as per the helmet manufacturer's instructions. The helmeted headform 138 is placed in the desired impact configuration and checked for alignment with the impact source 126 and the imaging system 116. The helmeted headform 138 should be visible within the capture region of the X-ray system 100. In some impact configurations, such as a crown impact, it may not be possible to capture the entire helmeted headform 138. As such, the alignment should be configured to capture the location of impact and resultant response of the helmet 104 on the headform 102 and/or other regions of interest.

Figure 4:
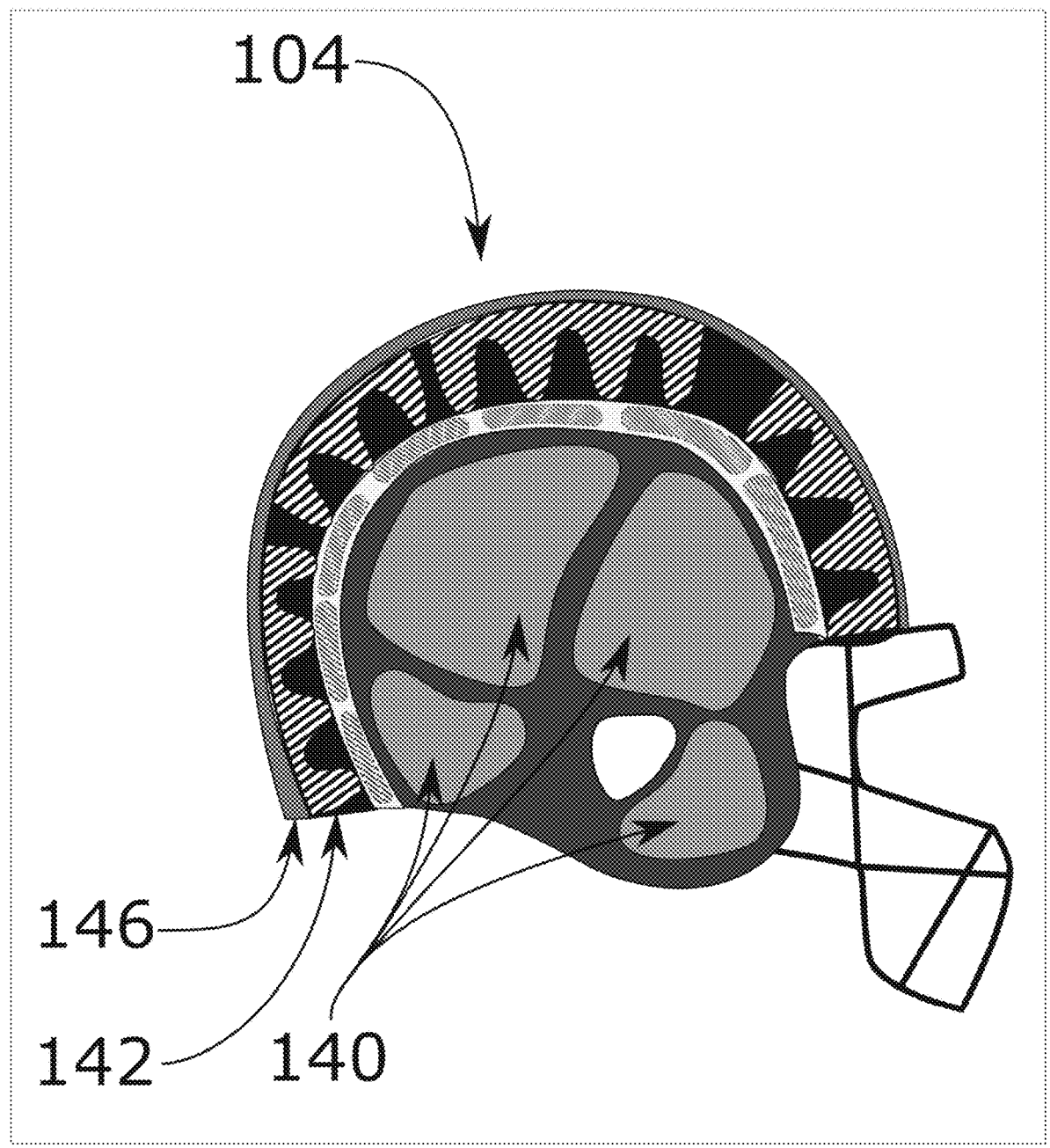
FIG. 4 is a cross-section view of the helmet of FIG. 1.
Figure 5:
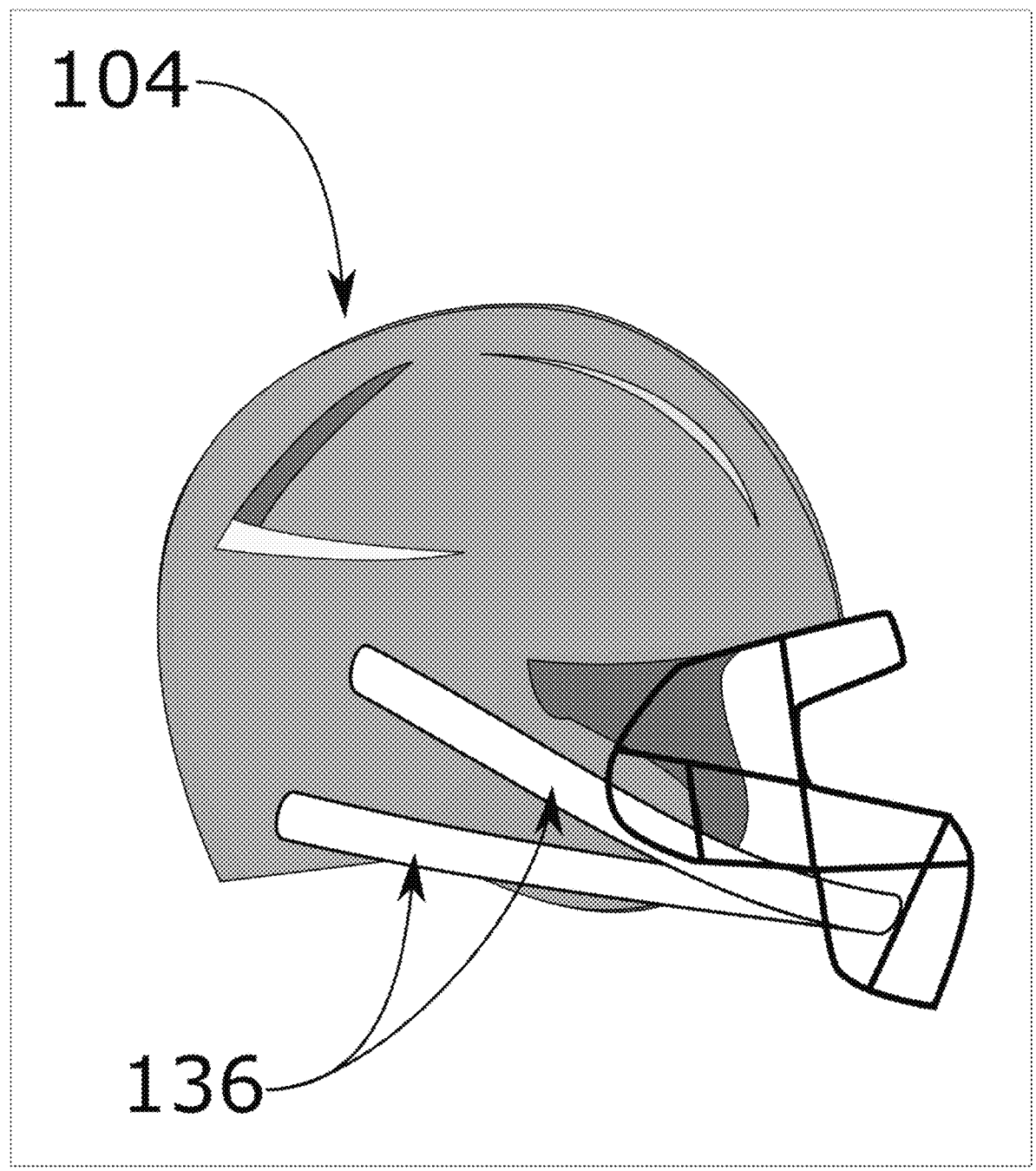
FIG. 5 is a side view of one potential helmet that could be tested using the present apparatus.
Figure 6:
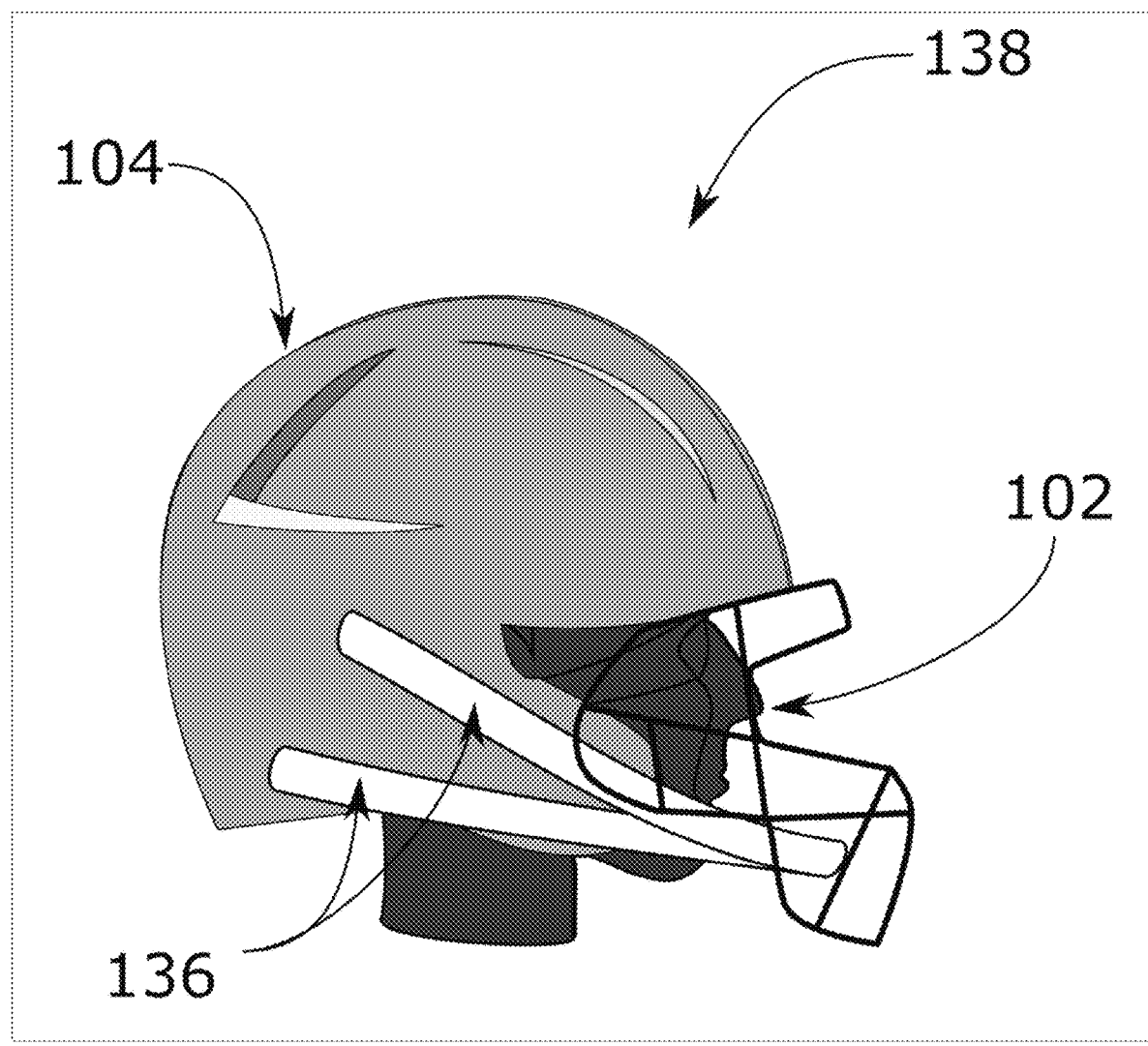
FIG. 6 is a side view of the helmeted headform, comprised of the headform of FIG. 3 and the helmet of FIG. 5.

After positioning has been set, a series of radiographic images are taken to determine the appropriate X-ray tube power and high-speed camera settings required to achieve the necessary image properties in order to distinguish features of interest. For example, if a pad 140 within the helmet liner 142 (FIG. 4) or a feature in the helmet retention system 136 (FIG. 5 & FIG. 6) is of interest, power level adjustments of the amperage and/or peak voltage delivered at the X-ray anode should be made. As a guide, successful images of helmet liners 142 have been taken with settings of 230 mA and 100 kV.

Figure 7:
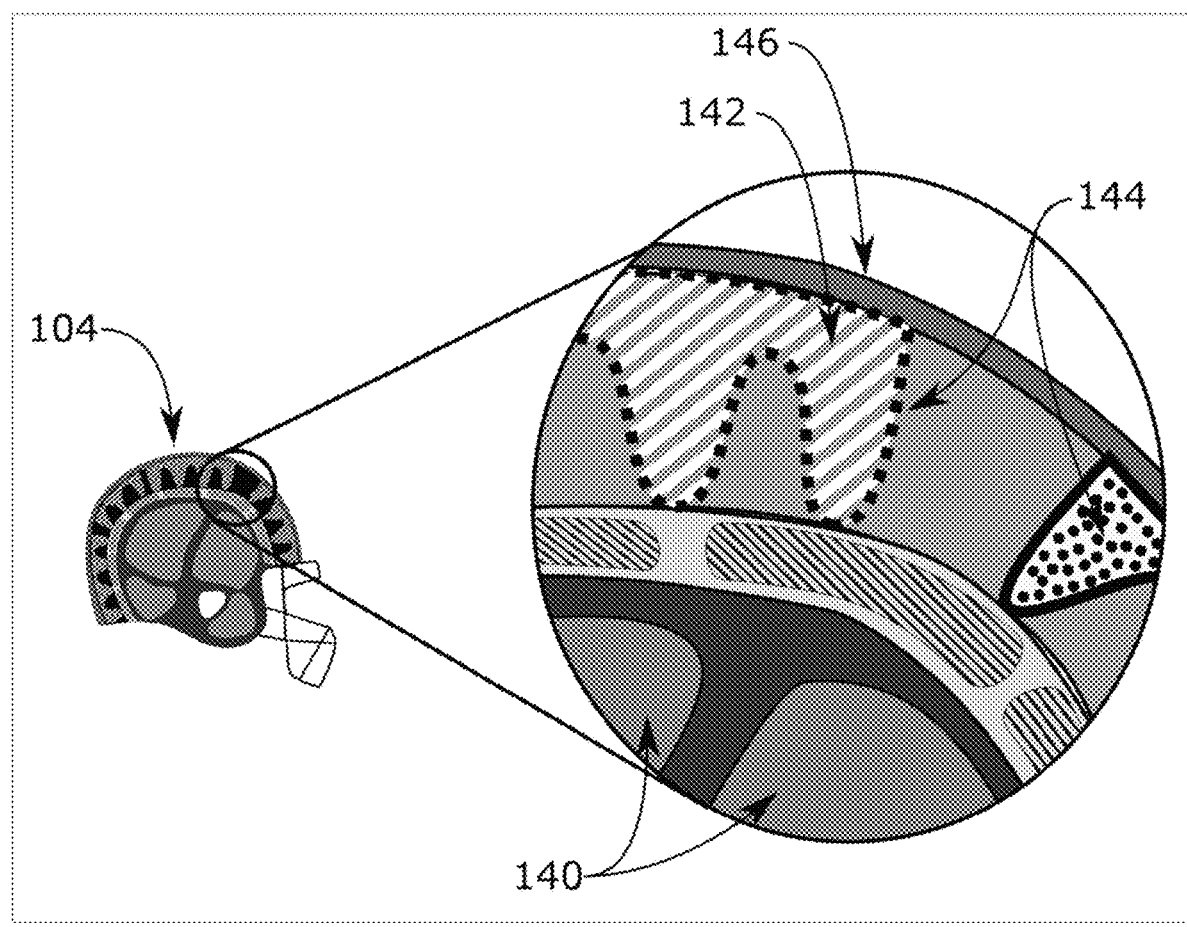
FIG. 7 is a detail view of the helmet cross-section of FIG. 4 with contrast material added to internal features.

If features of interest are not suitably distinguished, due to the low X-ray absorptive capacity of the materials of interest, then radiopaque X-ray contrast materials 144 should be added to the components of interest (FIG. 7) and the X-ray power levels should be adjusted accordingly. For the present embodiment, the preferred radiopaque contrast powder is barium sulphate ($BaSO_4$), which is commonly used in medical applications. A light application of adhesive on the surface of headgear components allows a coating of the contrast enhancing powder to be applied. Alternatively, $BaSO_4$ can be integrated and mixed into a flexible elastomer, thermoplastic, or thermoset, such as RTV silicone, and applied to a surface. Successful images have been acquired using coatings about 20 mm wide and about one millimeter thick. Mixing ratios ranging from 10% -50% by mass of $BaSO_4$ powder to binding agents have been successfully used for this purpose. The mixture or powder should be applied to the surface of interest or integrated into the helmet component of interest and allowed to cure prior to testing.

When features of interest are suitably distinguishable in static images, the impact force can be applied to the helmet 104 and the images recorded at the prescribed frame rate. For the majority of sport-related impact events, frame rates of 7,500 fps have been found to be sufficient to eliminate motion blur in the images. The use of a continuous X-ray source 106, as in the present invention, results in a limited capture time. To avoid damage to the anode, the X-ray tube operating parameters should be followed, as per the manufacturer. In the present embodiment, an electronic signal from the source of impact is used to trigger the X-ray source 106, with appropriate delays to ensure that the impact event is captured. The camera 110 is configured to capture when a change in incident light is detected. Data from the camera 110 and accelerometer array are recorded along with the impactor mass, materials, thickness, compliance, and impact velocity.

The accelerometer data is processed to determine the direction and magnitude of linear and rotational components of acceleration. This data is processed according to the existing standards. The images recorded by the image capture system 116 are analysed using image processing software. The current approach to analysis is through image stabilization, allowing the center of gravity of the headform 102 to be stabilized in the image to provide a better visualization of the interaction between headgear 104 components and the headform. For instance, image tracking algorithms allow investigation of the deformation of a helmet shell 146 and liner 142, determining the rate and level of compression within internal pads 140.

Detailed Description of Variations of the Methodology

There are a number of preferred variations on this methodology, described below:

Internal Stress/Strain Measurements Within a Headform

Existing headgear testing protocols use rigid headforms that match the size and weight of the human head. In addition, deformable headforms ranging from simple to complex, constructed of thermoset polymers that reproduce bone, a variety of elastomers that represent soft tissues, and artificial bio-fluids have been developed and publicly disclosed. However, these headforms alone cannot determine details of internal deformation, stress, or strain as a result of an impact event.

Figure 8:
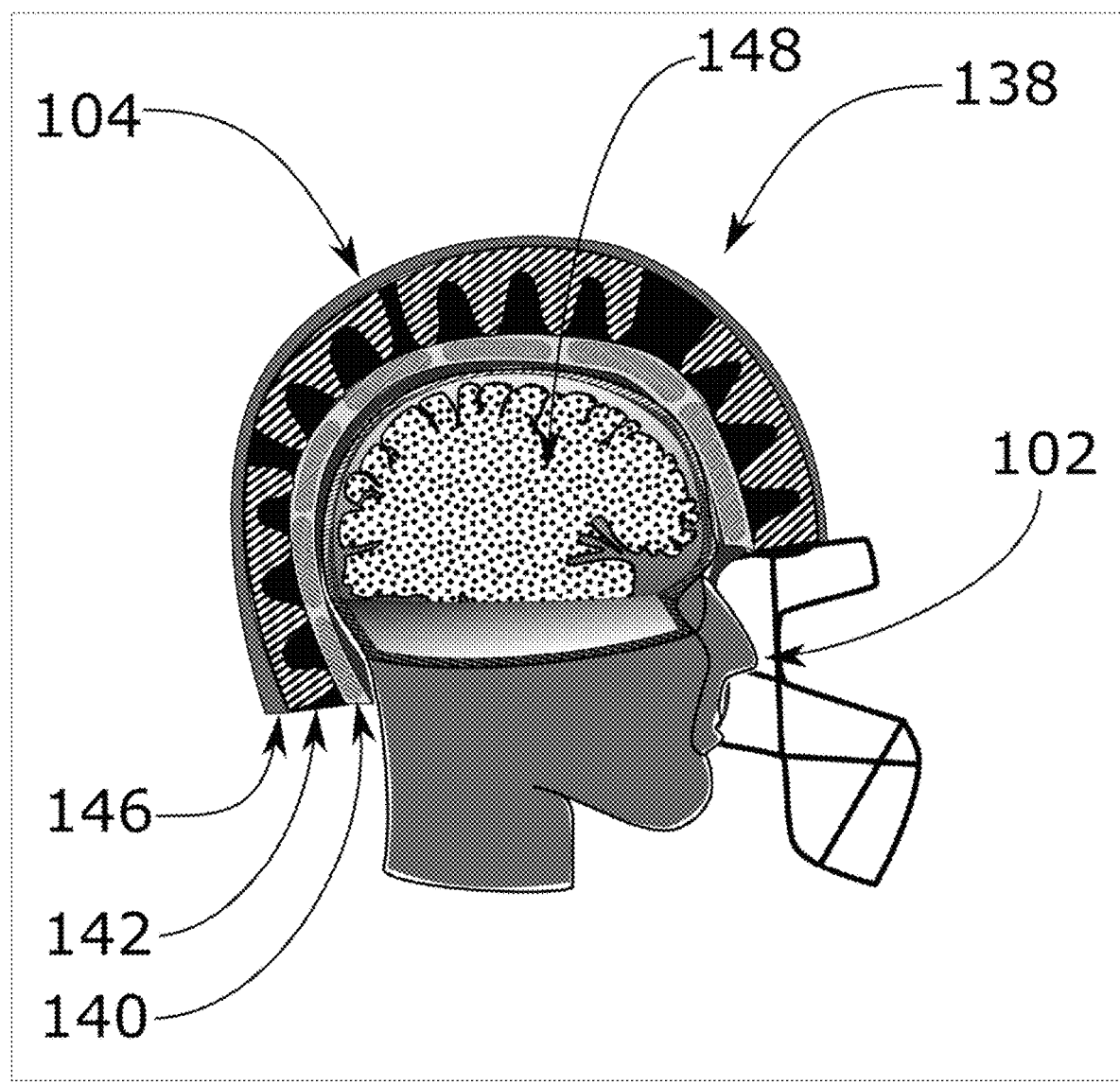
FIG. 8 is a cross-section view of the helmeted headform of FIG. 6 featuring integrated contrast markers.

The use of the present invention enables the investigation of stress transfer into the head of a helmet user. The methodology involved in this type of testing is identical to the headgear testing methodology, noted above, with the exception that headforms 102 can be constructed of deformable materials and they must contain internal contrast markers 148. During an applied impact, the displacement of the markers 148 within the headform 102 can be tracked to determine the internal deformation field. The resultant deformation field can be used in the determination of stress transfer and resulting tissue strain due to impact. As certain brain injuries have been linked to brain tissue strain, this methodology is more closely associated with injury outcomes than the correlations of acceleration alone. This methodology can be used for both bare or helmeted impacts (FIG. 8).

In the single radiographic plane configuration, internal radiopaque contrast markers 148 used for the purpose of tracing displacement must be placed in a single plane perpendicular to the incident X-ray beam 114 (FIG. 2). In a bi-planar (FIG. 9) or multi-planar configuration, the placement of the markers 114 does not need to be confined to a plane.

Figure 10:
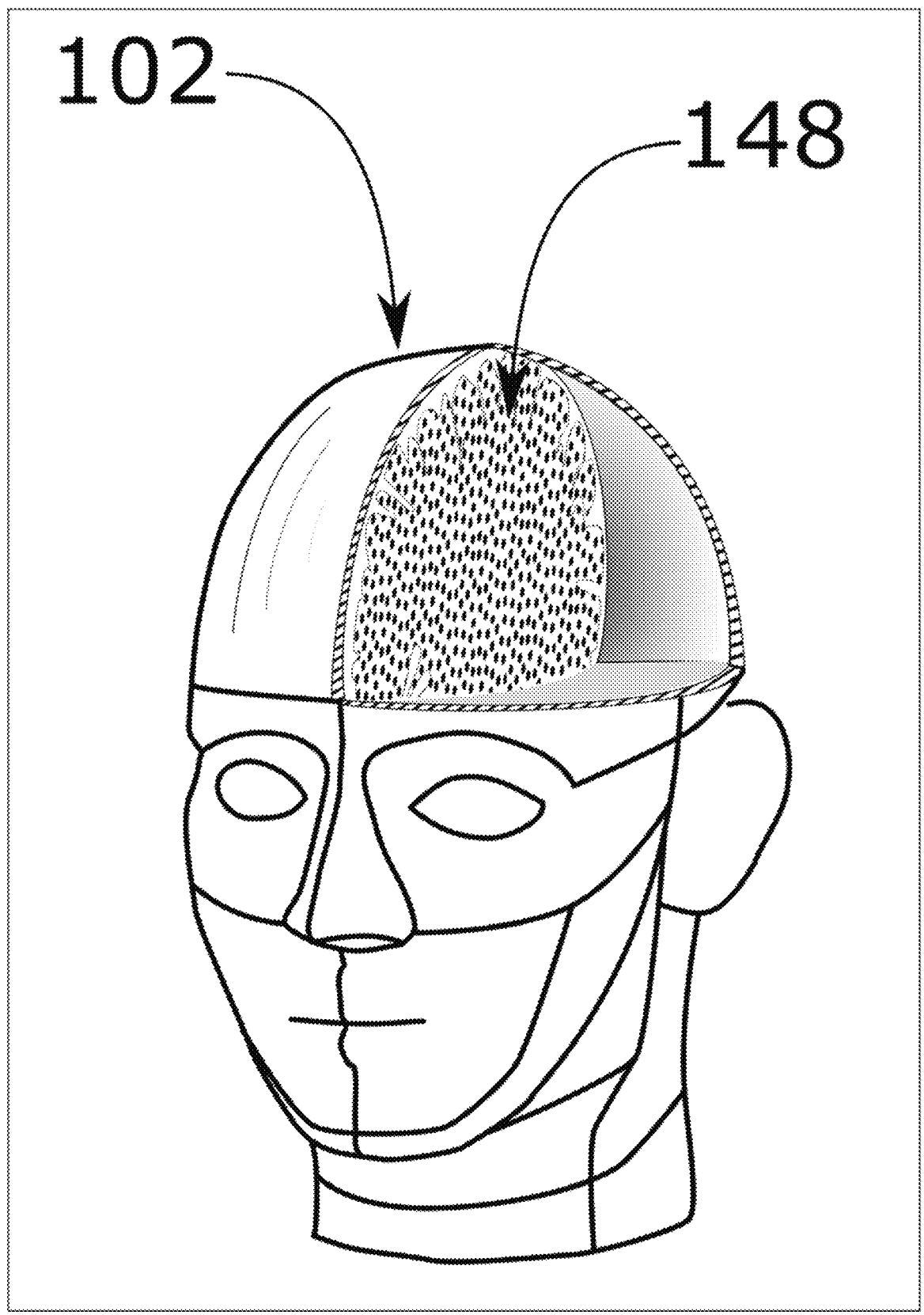
FIG. 10 is a cut-away perspective view of the headform of FIG. 3 featuring an integrated contrast layer.
Figure 11:
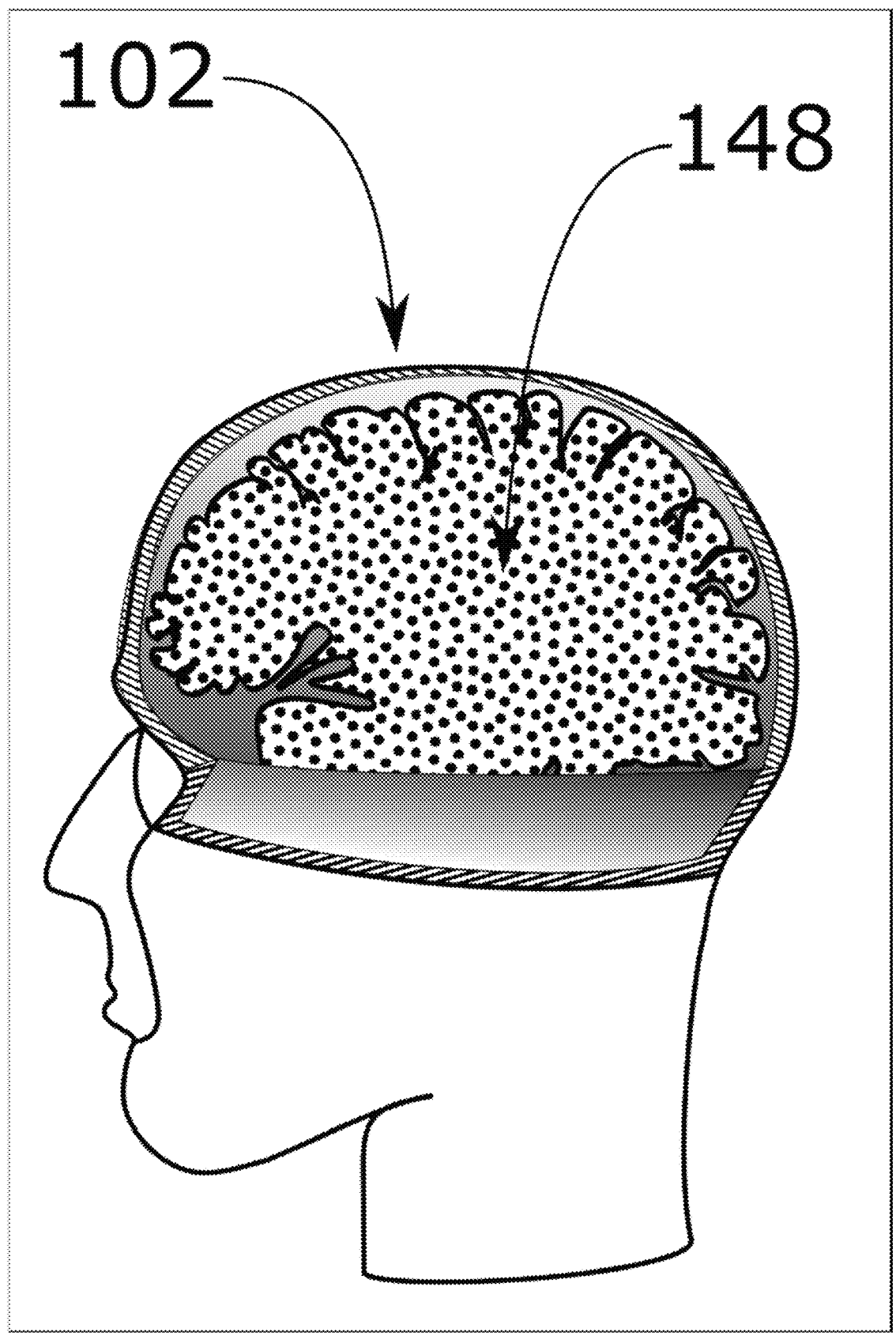
FIG. 11 is a side view of the cut-away of headform of FIG. 3.

Radiopaque markers must be placed within the surrogate brain of the deformable headform, as seen in (FIG. 10 & FIG. 11). The preferred approach to preparing radiopaque markers 148 is by mixing $BaSO_4$ powder at mass concentration ranging from 40% to 70% with an elastomer matrix of similar stiffness and density to the brain tissue simulant used. Metal powders could be used as radiopaque contrast agents, however the dynamic mechanical coupling between the markers and brain simulants may be compromised by the significantly higher density and stiffness of these materials. Typical marker sizes have a characteristic length-scale of approximately 2 mm. Alternatively, a thin film of elastomer, doped with radiopaque powder can be prepared containing a pattern of holes between 1 to 2 mm in diameter. These holes may be filled with undoped elastomer or air. The holes create a contrast pattern, which acts as a set of trackable markers during radiographic imaging. The hole size and film thickness should be adjusted to meet the contrast-to-noise ratio requirements for available X-ray power levels and imaging components within the system. Static images should be taken to ensure that the contrast-to-noise ratio is sufficient for the image processing and particle tracking algorithms used in the analysis. Preparation of radiopaque markers 148 may vary, but should result in a sufficient contrast-to-noise ratio for computer software to identify marker locations. The contrast-to-noise ratio should be on the order of 5 or greater with a minimum marker size of about 10 pixels, in order to minimize marker identification errors.

During testing, the impact load is applied to either the bare or helmeted headform 138 and the displacement of the markers 148 within the impact plane is recorded. The displacement history of the markers is a useful measure that can be related to injury, particularly through calculations of strain. If Digital Image Correlation (DIC) software is used, the full-field strain history within the headform 102 can be calculated. Stress transfer into the head due to the application of the impact force and/or applied acceleration can be determined. Together, the internal stress/strain data and the visualization of the deforming headgear 104 components can be used to optimize the design of headgear components to reduce the risk of brain injury due to impact.

Ballistic Testing of Helmets and Behind Armour Deformation

If the impact force is created by a ballistic event, such as a fragment of bullet impacting a military helmet, the same methodology of a headform 102 with a helmet 104 is used to visualize the deformation of the helmet and its possible impact on the headform. If a deformable headform 102 with internal radiopaque markers 148 is used in this testing configuration, the stress transfer and resulting displacement field into the headform can be measured for different impact configurations.

Other Sources of Impact Force

The impact force applied to the headform 102 or helmet 104 may come from a variety of sources, including drop impact events and overpressure. Other embodiments of the testing apparatus and methodology may include dropping the headform on a drop tower, monorail, or guided twin wire onto an anvil or various materials, where the impact on the anvil will occur within the field of view of the cineradiography apparatus. If a deformable headform 102 with internal radiopaque markers 148 is used in this testing configuration, the stress transfer and resulting displacement field into the headform can be measured for different drop configurations. These drops may or may not induce a rotational acceleration of the headform and headgear.

In yet another embodiment of the apparatus, the X-ray system may be configured perpendicular to the line of action from a directed overpressure event. Overpressure can be generated by an explosive charge or from a shock tube or blast wave simulator. If a deformable headform 102 with internal radiopaque markers 148 is used in this testing configuration, the stress transfer and resulting displacement field into the headform can be measured for different blast or shockwave configurations.

Bi-planar and Multi-planar X-ray Configurations

Figure 12:
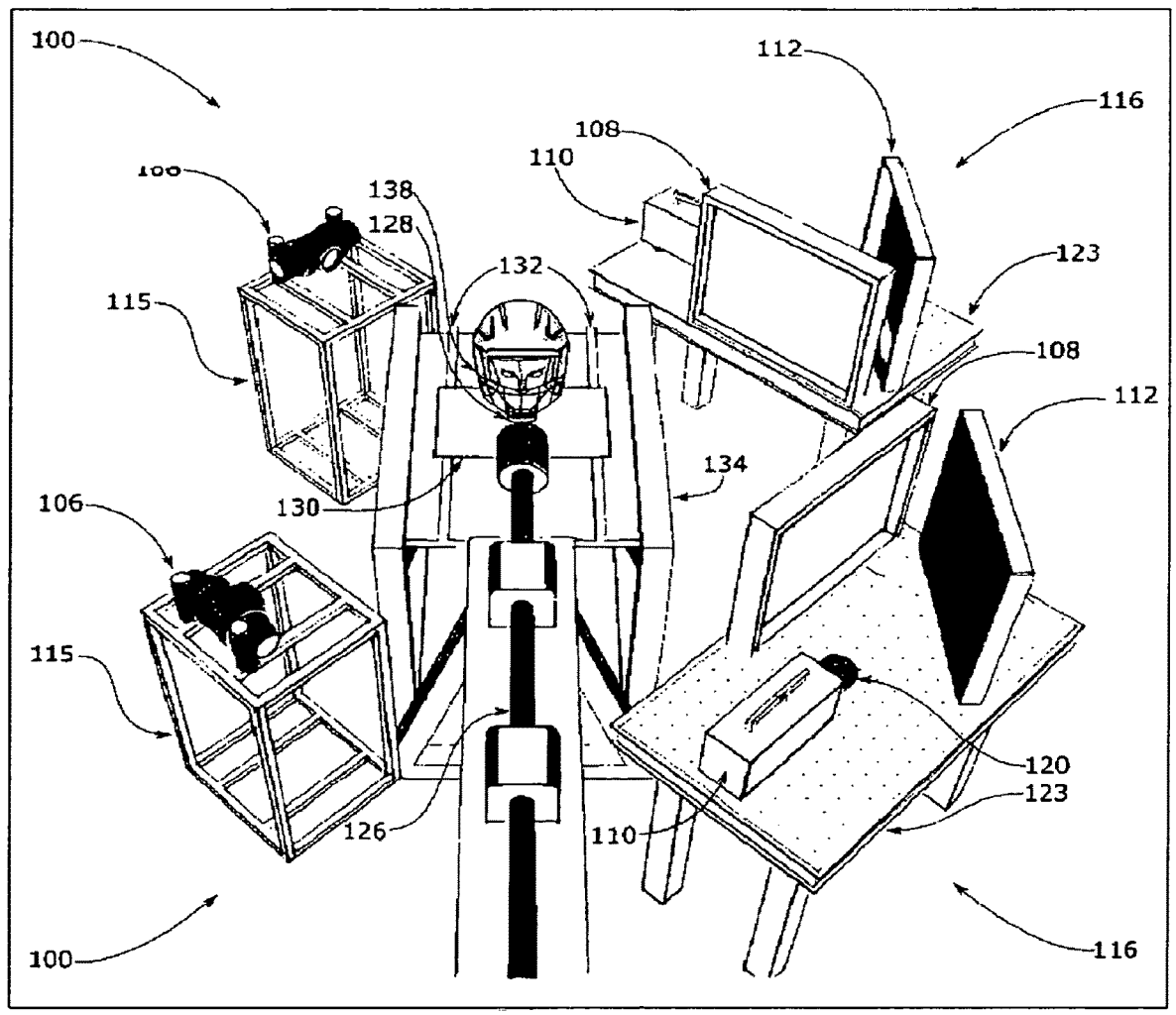
FIG. 12 is a perspective view of a biplanar embodiment of the cineradiography-based protective headgear testing apparatus as in FIG. 1.

An additional cineradiography system 100 could be used to provide a second view of the deformation and coupling of the headgear 104 to the headform 102, constituting a bi-planar system. In this configuration, which is shown in FIG. 12, the X-ray source 106 is not required to operate perpendicular to the line of impact force. The preferred embodiment of the bi-planar system places the X-ray sources 106 and optical systems 116 at an angular offset of +/−30 degrees normal to the line of action of the impact force, respectively.

Multi-planar cineradiography configurations are also possible to allow visualization of the impact event from any desired angle to image the response of the helmet liner 142 system with the headform.

Alternate Constructions of the X-Ray System

Figure 13:
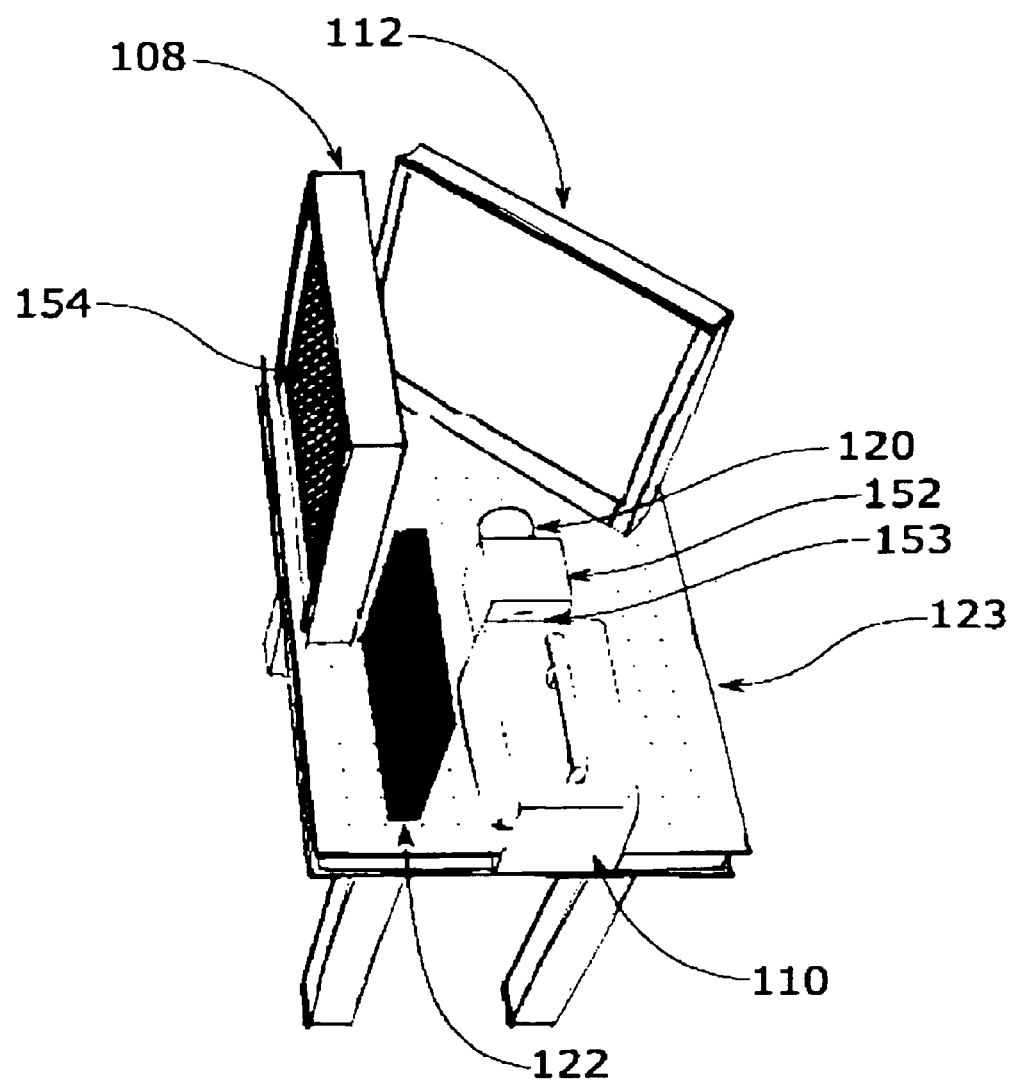
FIG. 13 is a perspective view of an alternative embodiment of the optical components of the cineradiography-based protective headgear testing apparatus, with the inclusion of an antiscatter grid and an image intensifier optically coupled to a high-speed camera.

In very low light applications, an image intensifier 152 could be added to the image capture system 116 of the X-ray system 100, as seen in FIG. 13. However, if more light is needed, it is more effective to move the X-ray source 106 closer to the scintillator 108 as X-ray flux changes with the square of that distance. Changing the distance will reduce the field of view, but will not degrade the image quality to the extent that an image intensifier would.

Figure 9:
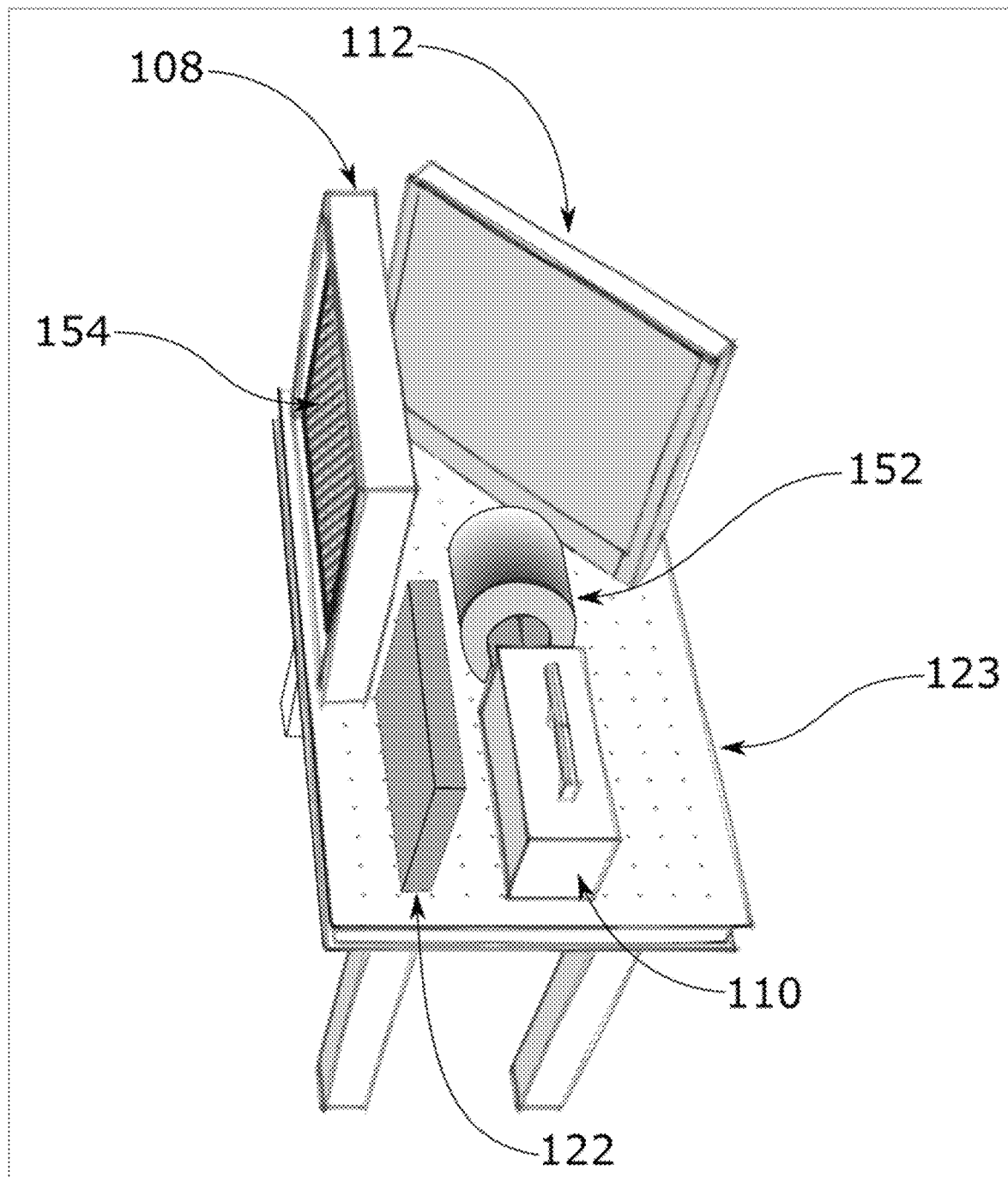
FIG. 9 is a perspective view of an embodiment of the optical components of the cineradiography-based protective headgear testing apparatus as in FIG. 1 with the inclusion of an antiscatter grid.

FIGS. 9 and 13 show how an anti-scatter grid 154 with the appropriate focal distance could be added between the scintillator 108 the X-ray source 106, this will reduce the intensity of X-ray reaching the scintillator and may limit the achievable frame rate. The current embodiment does not use an anti-scatter grid 154 as X-ray scatter was found to have a negligible effect on image quality at the frame rates and resolution of the current system.

Figure 14:
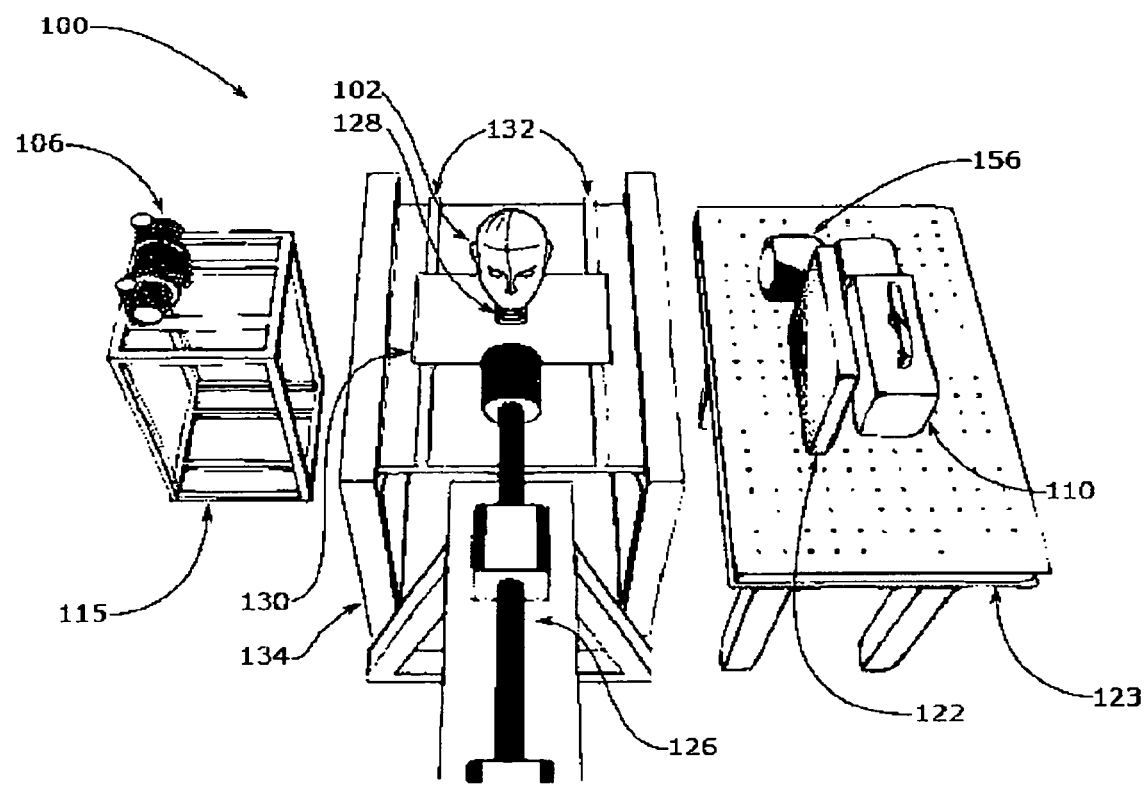
FIG. 14 is a perspective view of an alternative embodiment of the cineradiography-based protective headgear testing apparatus, including an optional antiscatter grid and an X-ray image intensifier optically coupled to a high-speed camera.

The use of commercial X-ray image intensifiers (e.g., Thales TH9447QX or similar models), having a sufficiently short decay time output phosphor could provide an alternate construction of the X-ray system, as seen in FIG. 14.

In the event that the chosen scintillator 108 or X-ray image intensifier 156 does not have sufficiently short decay times, decay-weighted image subtraction techniques can be used during the image processing stage of the data analysis to increase the effective framing rates of the detection system.

What is claimed is:

1. A method for testing a helmet comprising the steps of:
   placing the helmet upon a headform;
   placing said headform between in a cineradiography system; wherein the cineradiography system comprises:
      at least one continuous X-ray source having a power rating of no less than 40 kW;
      at least one converter configured to convert X-radiation produced by the X-ray source to visible light with output at a predetermined wavelength, wherein the converter is selected from a scintillator and an X-ray image intensifier, the converter having a decay time of no more than 10 microseconds; and
      at least one high-speed video capture system having a monochrome sensor with a peak sensor sensitivity at about the predetermined wavelength of the output of the converter;
   wherein the cineradiography system is configured to capture a plurality of consecutive digital radiographic images of an object deforming under an applied dynamic force at an image capture rate of 5,000 to 100,000 frames per second, and
   wherein the headform is placed between the X-ray source and the converter;
   imparting an impact force to the helmet, wherein a line of action of the impact force is oriented in a direction perpendicular to a flux of the X-radiation produced by the X-ray source; and
   observing and recording, using said cineradiography system, one or more of impact-induced deformation and motion of the helmet and its component, deformation and motion of the headform, and interaction of the helmet components with the headform.

2. The method of claim 1, wherein the continuous X-ray source is a multi-anode flash X-ray source.

3. The method of claim 1, wherein the continuous X-ray source is a rotating anode X-ray tube source.

4. The method of claim 1, wherein the converter is a scintillator.

5. The method of claim 4, wherein the high-speed video capture system is optically-coupled to an image intensifier.

6. The method of claim 4, wherein an anti-scatter grid is placed between the X-ray source and the scintillator.

7. The method of claim 1 wherein the high-speed video capture system comprises a camera lens having an aperture with an f-stop or f-number of 1.4 or below.

8. The method of claim 1, wherein the converter is an X-ray image intensifier optically-coupled to the high-speed video capture system.

9. The method of claim 1, wherein the cineradiography system comprises multiple cineradiographic sets of X-ray sources, converters, and high-speed video capture systems, with each set placed at an angular offset to enable bi-planar, stereoscopic imaging.

10. The method of claim 1, wherein the impact force is imparted by one or more of a linear impactor; a pendulum impactor; dropping the helmet and headform onto an anvil; dropping a mass onto the helmet and headform; accelerating a first headform and helmet couple into a second stationary helmet and headform to reconstruct a collision event; a shock or blast wave from a shock tube, detonating explosive, thermite, a discharging gun, rifle, or shoulder-launched weapon; and ballistic impact of a projectile, bullet, fragment, or fragment simulating projectile.

11. The method of claim 10, wherein the impact force is imparted by a linear impactor.

12. The method of claim 10, wherein the impact force is imparted by dropping the helmet and headform onto the anvil, where said anvil may be flat or hemispherical and may be inclined at an angle or remain perpendicular to a direction of the drop.

13. The method of claim 1, wherein the headform is of an anthropomorphic shape and comprised of a single monolithic material or a multitude of materials, components, and structures.

14. The method of claim 1, wherein a plurality of accelerometers are positioned within the headform and said headform has a structure that provides a means for positioning internal accelerometers.

15. The method of claim 1, wherein a plurality of accelerometers are positioned external to the headform, but mounted rigidly to it, where said headform has a structure or attachment that provides a means for positioning rigidly attached external accelerometers.

16. The method of claim 1, including the step of striking the helmet at a plurality of locations on an outer surface of the helmet.

17. The method of claim 1, wherein the surface of an impactor impacting the helmet has a flat surface, domed surface, spherical surface, or said impactor has a radius of curvature that corresponds to that of another helmet or piece of protective equipment.

18. The method of claim 1, wherein the headform is attached to a fixed or flexible neck assembly.

19. The method of claim 1, wherein the helmet is designed for recreational or professional sports.

20. The method of claim 1, wherein the helmet is designed for leisure or transportation activities.

21. The method of claim 1, wherein the helmet is designed for industrial safety purposes.

22. The method of claim 1, wherein the helmet is designed as military protective equipment.

23. The method of claim 1, wherein the helmet is any style of headgear designed to protect a wearer from impact forces.

24. The method of claim 1, wherein the cineradiography system includes two or more X-ray sources for bi-planar, stereoscopic imaging.

25. The method of claim 1, wherein a radiopaque contrast material comprising a radiopaque powder having a higher X-ray absorption capacity than the helmet materials, is integrated into or applied to an inner or outer surface of at least one helmet component to increase the contrast and radiographic visibility of said helmet component in order to facilitate visualization, tracking, and measurement of their deformation due to the impact force.

26. The method of claim 1, wherein a radiopaque contrast material comprising a radiopaque adhesive, radiopaque paint, or a radiopaque polymer, comprising a mixture of an adhesive, paint, or polymer, and a radiopaque powder having a higher X-ray absorption capacity than the helmet materials, is integrated into or applied to an inner or outer surface of at least one helmet component to increase the contrast and radiographic visibility of said helmet component in order to facilitate visualization, tracking, and measurement of their deformation due to the impact force.

27. The method of claim 1, wherein the headform is of an anthropomorphic shape and comprises a combination of deformable polymeric or elastomeric components that are designed as an approximation for human tissue response.

28. The method of claim 27, wherein the headform contains a plurality of radiopaque contrast markers, having a higher X-ray absorption capacity than the helmet and headform materials, embedded within the polymeric components of said headform that further enable radiographic monitoring of the deformation, displacement, and strain of said polymeric components.

29. The method of claim 28, wherein the plurality of radiopaque contrast markers are aligned along an internal sagittal plane, an internal coronal plane, or an internal horizontal plane within the headform or a tissue-simulating brain surrogate contained within said headform.

30. The method of claim 28, wherein the plurality of discrete radiopaque markers are composed of a mixture comprising a radiopaque contrast material and polymer matrix, and said polymer is mechanically similar to its surroundings within said headform.

31. The method of claim 28, wherein the plurality of radiopaque markers are introduced into the headform as a series of discrete particles or powder grains.

32. The method of claim 27, wherein the headform contains an embedded radiopaque contrast layer or multiple embedded radiopaque contrast layers integrated into the headform, wherein said layer comprises a radiopaque powder, having a higher X-ray absorption capacity than the helmet and headform materials, mixed with a polymer matrix having similar mechanical properties to its surroundings within said headform, that further enable radiographic monitoring of the deformation of components of said headform using the cineradiography system.

33. The method of claim 32, wherein the embedded radiopaque contrast layer forms a contiguous structure containing holes or gaps, where said holes or gaps contain air or a polymer having a lower X-ray attenuation capacity than the composition of said contiguous structure, producing a plurality of identifiable markers in the radiographic images captured by the cineradiography system and where said holes or gaps enable direct mechanical coupling of the embedded radiopaque contrast layer through improved physical coupling to its polymeric surroundings.

34. A cineradiography system comprising:
   at least one continuous X-ray source having a power rating of no less than 40 kW;
   at least one converter configured to convert X-radiation to visible light with output at a predetermined wavelength, wherein the converter is selected from a scintillator and an X-ray image intensifier, the converter having a decay time of no more than 10 microseconds; and
   at least one high-speed video capture system having a monochrome sensor with a peak sensor sensitivity at about the predetermined wavelength of the output of the converter;
   wherein the cineradiography system is configured to capture a plurality of consecutive digital radiographic images of an object deforming under an applied dynamic force at an image capture rate of 5,000 to 100,000 frames per second.

35. The cineradiography system of claim 34, wherein the continuous X-ray source is a rotating anode X-ray tube source.

36. The cineradiography system of claim 34, wherein the continuous X-ray source is a multi-anode flash X-ray source.

37. The method of claim 34 wherein the high-speed video capture system comprises a camera lens having an aperture with an f-stop or f-number of 1.4 or below.

38. The cineradiography system of claim 34, wherein the converter is a scintillator.

39. The cineradiography system of claim 38, wherein the high-speed video capture system is optically-coupled to an image intensifier.

40. The cineradiography system of claim 38, wherein an anti-scatter grid is placed between the X-ray source and the scintillator.

41. The cineradiography system of claim 34, wherein the converter is an X-ray image intensifier optically-coupled to the high-speed video capture system.

42. The cineradiography system of claim 34, wherein the cineradiography system comprises multiple cineradiographic sets of X-ray sources, converters, and high-speed video capture systems, with each set placed at an angular offset to enable bi-planar, stereoscopic imaging.

\* \* \* \* \*